United States Patent
Roedily et al.

(10) Patent No.: US 12,118,743 B2
(45) Date of Patent: Oct. 15, 2024

(54) ELECTRONIC APPARATUS AND OBJECT DETECTION METHOD

(71) Applicant: VIA Technologies, Inc., Taipei (TW)

(72) Inventors: Winner Roedily, Taipei (TW); Hsueh-hsin Han, Taipei (TW)

(73) Assignee: VIA Technologies, Inc., Taipei (TW)

( * ) Notice: Subject to any disclaimer, the term of this patent is extended or adjusted under 35 U.S.C. 154(b) by 357 days.

(21) Appl. No.: 17/686,623

(22) Filed: Mar. 4, 2022

(65) Prior Publication Data

US 2022/0366593 A1    Nov. 17, 2022

Related U.S. Application Data

(60) Provisional application No. 63/175,582, filed on Apr. 16, 2021.

(30) Foreign Application Priority Data

Oct. 15, 2021  (TW) .................................. 110138434

(51) Int. Cl.
*G06T 7/62* (2017.01)
*G06T 7/70* (2017.01)

(52) U.S. Cl.
CPC .................. *G06T 7/70* (2017.01); *G06T 7/62* (2017.01); *G06T 2207/20081* (2013.01); *G06T 2207/30248* (2013.01)

(58) Field of Classification Search
CPC ....................................................... G06T 7/70
See application file for complete search history.

(56) References Cited

U.S. PATENT DOCUMENTS

| | | | | |
|---|---|---|---|---|
| 2011/0050685 A1* | 3/2011 | Yamada | .................. | G06T 15/10 |
| | | | | 345/419 |
| 2021/0082135 A1* | 3/2021 | Xu | .......................... | G06T 7/529 |
| 2021/0174537 A1* | 6/2021 | Ye | ........................... | G06N 3/045 |
| 2021/0349175 A1* | 11/2021 | Ko | ............................. | G01S 5/16 |
| 2021/0407125 A1* | 12/2021 | Mahendran | ............ | G06V 20/20 |
| 2023/0260255 A1* | 8/2023 | Tan | ....................... | G06N 3/0464 |
| | | | | 382/100 |

* cited by examiner

*Primary Examiner* — Oneal R Mistry
(74) *Attorney, Agent, or Firm* — McClure, Qualey & Rodack, LLP

(57) ABSTRACT

The present disclosure provides an electronic apparatus and an object detection method. The electronic apparatus includes a storage device and a processor. The storage device stores an estimation module. The processor is coupled to the storage device and configured to execute the estimation module. The processor acquires a sensed image provided by an image sensor, and inputs the sensed image to the estimation module so that the estimation module outputs a plurality of estimated parameters. The processor calculates two-dimensional image center coordinates of an object image in the sensed image based on the plurality of estimated parameters, and calculates three-dimensional center coordinates corresponding to the object image based on the two-dimensional image center coordinates and an offset parameter in the plurality of estimated parameters. Thus, the location of the object image in the sensed image can be determined accurately.

20 Claims, 5 Drawing Sheets

ELECTRONIC APPARATUS AND OBJECT DETECTION METHOD

CROSS-REFERENCE TO RELATED APPLICATIONS

This application claims the priority benefit of U.S. provisional application Ser. No. 63/175,582, filed on Apr. 16, 2021, and also the priority benefit of Taiwan application serial no. 110138434, filed on Oct. 15, 2021. The entirety of the above-mentioned patent applications are hereby incorporated by reference herein and made a part of this specification.

TECHNICAL FIELD

The present disclosure relates to an image analysis technology, and in particular, to an electronic apparatus and an object detection method.

BACKGROUND

With regard to existing image object detection technologies, to accurately determine the location of an object present in an image, the object in the image must have an image of the complete object, so that a processor can perform analysis properly on an object range of the image of the complete object, to determine an accurate center of the object. In other words, if the object in the image has a truncated image, the processor will not be able to determine the center of the object accurately, but obtain wrong location information. In this regard, for example, in applications related to driving distance sensing, if a vehicle image in driving images is a truncated image, then it will be impossible for a vehicle that a user is driving to determine a correct location for the vehicle image, which may lead to subsequent incorrect determinations in functions such as automatic warning by the vehicle, vehicle distance detection, and automatic vehicle driving. This problem needs to be solved, especially in related applications where only a single monocular camera is used for driving distance sensing.

SUMMARY

In view of the aforementioned problem, the present disclosure provides an electronic apparatus and an object detection method for accurate location determination on an object image in a sensed image.

The electronic apparatus of the present disclosure includes a storage device and a processor. The storage device stores an estimation module. The processor is coupled to the storage device and configured to execute the estimation module. The processor acquires a sensed image provided by an image sensor. The processor inputs the sensed image to the estimation module so that the estimation module outputs a plurality of estimated parameters. The processor calculates two-dimensional image center coordinates of an object image in the sensed image based on the plurality of estimated parameters. The processor calculates three-dimensional center coordinates corresponding to the object image based on the two-dimensional image center coordinates and an offset parameter in the plurality of estimated parameters.

The object detection method of the present disclosure includes steps of: executing an estimation module; acquiring a sensed image provided by an image sensor; inputting the sensed image to the estimation module so that the estimation module outputs a plurality of estimated parameters; calculating two-dimensional image center coordinates of an object image in the sensed image based on the plurality of estimated parameters; and calculating three-dimensional center coordinates corresponding to the object image based on the two-dimensional image center coordinates and an offset parameter in the plurality of estimated parameters.

Based on the foregoing, the electronic apparatus and the object detection method of the present disclosure can determine the three-dimensional center coordinates corresponding to the object in the object image of the sensed image, to enable an accurate determination on the location of the object.

To make the above objectives and features of the present disclosure more obvious and easy to understand, the following descriptions will be provided in detail in conjunction with exemplary embodiments and the accompanying drawings.

Figure 1:
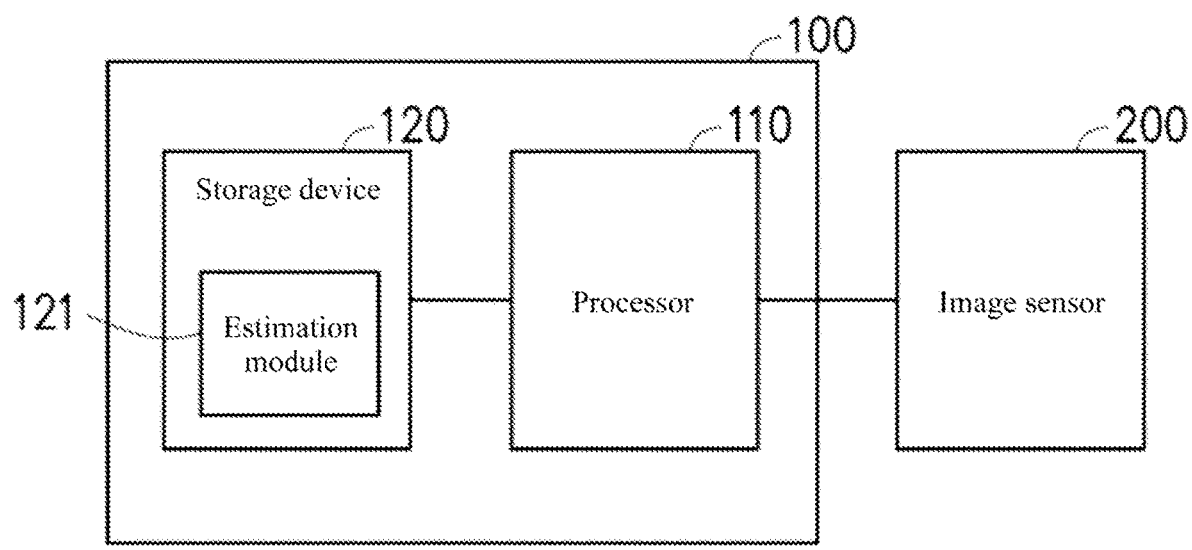
FIG. 1 is a diagram illustrating an electronic apparatus according to an embodiment of the present disclosure.

Numerical References in the Drawings are Simply Shown Below:

100: electronic apparatus; 110: processor; 120: storage device; 121: estimation module; 200: image sensor; 210, 220: reference image; 201: reference object image; 202, 402, 502: rectangle mark; 203, 205, 403, 405, 503, 505: center point; 204, 404, 504: cuboid mark; 410, 500: sensed image; 420: diagram illustrating the real world outside the sensed image; 401: object image; 501: object; and S310-S350: steps.

DETAILED DESCRIPTION

To make the contents of the present disclosure clear, the following describes exemplary embodiments in which the present disclosure can be implemented. In addition, wherever possible, elements/components/steps designated by same reference numerals represent identical or similar parts.

Figure 5:
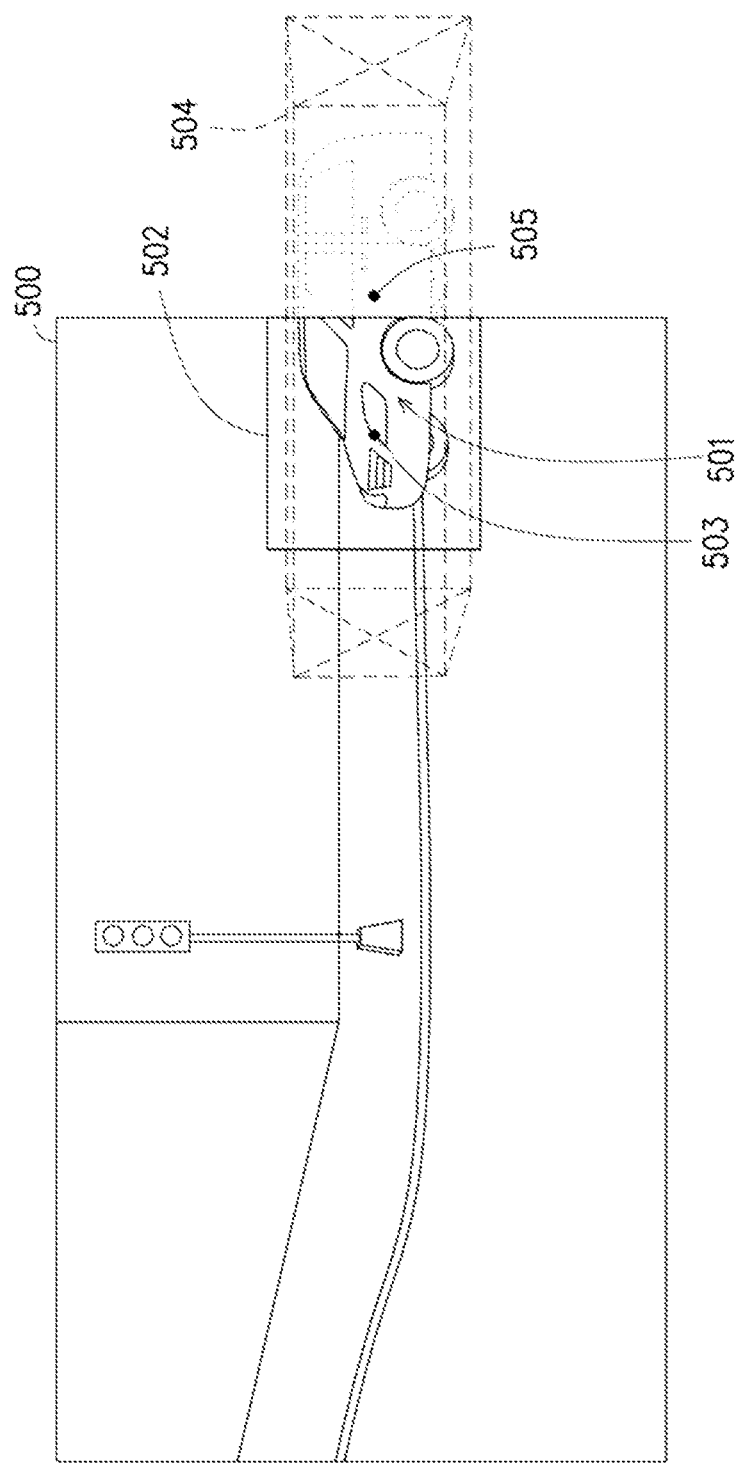
FIG. 5 is a diagram illustrating a result from a prior object detection method on a sensed image.

Prior object detection methods generally cannot determine the location information of an object in a truncated object image accurately. FIG. 5 is a diagram of a result from a prior object detection method on a sensed image of a monocular camera, where the sensed image 500 includes a truncated image of an object 501. A rectangle mark 502 determined by the prior object detection method indicates an image range of the object 501 in the sensed image 500, and the center of the rectangle mark 502 is designated at 503. A cuboid mark 504 determined by the prior object detection method indicates a range of the object 501 in a three-dimensional space, and the center of the cuboid mark 504 in the three-dimensional space is designated at 505. As shown in FIG. 5, there is an obvious difference between the range (i.e., the cuboid mark 504) of the object 501 in the three-dimensional space determined by the prior object detection method and the true location of the object 501. In some applications, a panoramic image may be obtained by using a plurality of cameras to avoid a truncated image, which, however, will result in an increased cost and increased complexity of an image system. The present disclosure is intended to improve the accuracy of the object detection method in determining the location information of an object in a truncated image using only a single monocular camera, without increasing the cost and the complexity of the image system.

FIG. 1 is a diagram illustrating an electronic apparatus according to an embodiment of the present disclosure. Referring to FIG. 1, the electronic apparatus 100 includes a processor 110 and a storage device 120. The processor 110 is coupled to the storage device 120 and an external image sensor 200. The storage device 120 is configured to store an estimation module 121. In the present embodiment, the electronic apparatus 100 may be, for example, an embedded apparatus integrated into a vehicle, and the image sensor 200 may be, for example, a vehicle camera installed on the vehicle to capture images of situations in front of or around the vehicle. The processor 110 may detect the locations of other vehicles near the vehicle for use in the calculation of related data for functions such as automatic vehicle warning or automatic vehicle driving, for example, by analyzing real-time images provided by the image sensor 200. However, the implementation of the electronic apparatus of the present disclosure is not limited to this. In an embodiment, the electronic apparatus 100 may also be disposed on other movable equipment or fixed equipment and may sense images of the surroundings by means of the image sensor 200, and the processor 110 may detect surrounding objects by analyzing real-time images provided by the image sensor 200.

In the present embodiment, the estimation module 121 may be an object detecting neural network (NN) module and may, for example, use a keypoint estimation network, wherein, the keypoint estimation network may further be implemented, for example, by using CenterNet algorithm or ExtremeNet algorithm. The keypoint estimation network may detect an object in an image as a keypoint in the image and treat other characteristics of the object (such as the size or location of the object) as regression problems for the keypoint. However, the estimation module 121 of the present disclosure is not limited to the above description. In other embodiments of the present disclosure, the estimation module 121 may also be implemented by using other neural network models or other similar algorithms that can estimate a plurality of keypoints in an image.

In the present embodiment, the processor 110 may be, for example, a processing circuit or a control circuit such as a central processing unit (CPU), a microprocessor control unit (MCU) or a field programmable gate array (FPGA), and the present disclosure is not limited thereto. In the present embodiment, the storage device 120 may be, for example a memory, and may be configured to store the estimation module 121, image data provided by the image sensor 200, and related software programs or algorithms, for access and execution by the processor 110. The image sensor 200 may be a camera of a CMOS image sensor (CIS) or a charge coupled device (CCD).

Figure 2:
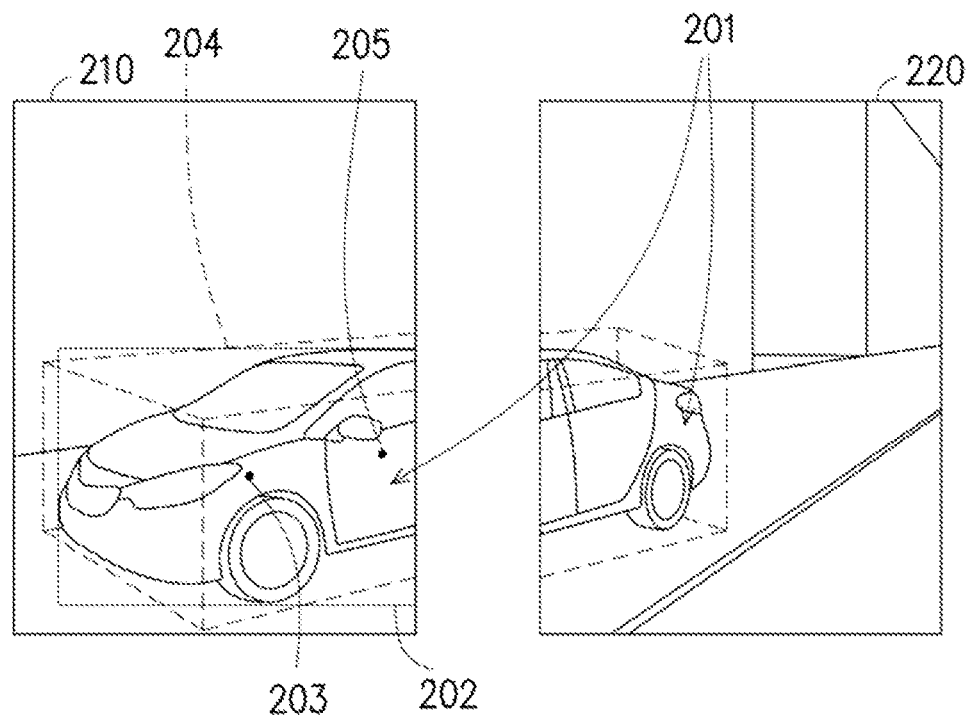
FIG. 2 is a diagram illustrating reference images according to an embodiment of the present disclosure.

FIG. 2 is a diagram illustrating reference images according to an embodiment of the present disclosure. Reference is now made to FIG. 1 and FIG. 2. In the present embodiment, the estimation module 121 may be trained in advance with a plurality of groups of reference images and a plurality of groups of reference estimated parameters corresponding to the plurality of groups of reference images, and each of the plurality of groups of reference images includes at least one reference object image, with each reference object corresponding to a group of reference estimated parameters. Each group of reference images may include a plurality of reference images respectively acquired by a plurality of different image sensors of a reference image collection system (e.g., an image collection vehicle having a plurality of external cameras), for example, comprising a plurality of reference images respectively acquired by a front (main) camera and a side (auxiliary) camera. Thus, a complete image of an object may be obtained by a truncated image part of the object captured by the front (main) camera and other truncated image parts of the object from the images captured by the side (auxiliary) camera, for training the estimation module 121. The reference estimated parameters corresponding to each reference object may be collected by a plurality of different sensors, for example, including a distance sensor, and the corresponding reference estimated parameters are annotated for each reference object. In the present embodiment, each group of reference images and the reference estimated parameters for training the estimation module 121 may be, for example, a NuScenes dataset or a KITTI dataset. However, the present disclosure is not limited thereto.

As shown in FIG. 2, a reference image 210 and a reference image 220 of FIG. 2 may be of a group of reference images. The reference image 210 and a reference image 220 may be acquired by two different image sensors respectively. In the present embodiment, the reference image 210 may be acquired, for example, by the front (main) camera, and the reference image 220 may be acquired, for example, by the side (auxiliary) camera. Moreover, the reference image 210 and a reference image 220 may correspond to a group of reference estimated parameters, and a group of reference estimated parameters includes, for example, a plurality of estimated parameters listed in Table 1 below.

TABLE 1

| Reference estimated parameter | Numerical range |
| --- | --- |
| x_Left | from 0 to an image (frame) width |
| y_Top | from 0 to image (frame) height |
| x_Right | from 0 to an image (frame) width |
| y_Bottom | from 0 to image (frame) height |
| $H_{cub}$ | >0 |
| $W_{cub}$ | >0 |
| $L_{cub}$ | >0 |
| Loc_Z | >0 |
| Rot_Y | $-\pi \sim \pi$ |
| $\delta x$ | $-\infty \sim \infty$ |
| $\delta y$ | $-\infty \sim \infty$ |

Referring to the above Table 1, a group of reference estimated parameters includes a first boundary coordinate x_Left, a second boundary coordinate y_Top, a third boundary coordinate x_Right, and a fourth boundary coordinate y_Bottom corresponding to a rectangle mark 202 shown in FIG. 2. The rectangle mark 202 defines an image range for a part of a reference object image 201 in the reference image 210 acquired by the front (main) camera, and the first boundary coordinate x_Left, the second boundary coordinate y_Top, the third boundary coordinate x_Right, and the fourth boundary coordinate y_Bottom may be used for determining the two-dimensional image center coordinates $(x_{C2D}, y_{C2D})$ for the center point 203 of the rectangle mark 202. The first boundary coordinate x_Left may depict the location of the left boundary of the rectangle mark 202. The second boundary coordinate x_Top may depict the location of the top boundary of the rectangle mark 202. The third boundary coordinate x_Right may depict the location of the right boundary of the rectangle mark 202. The fourth boundary coordinate x_Bottom may depict the location of the bottom boundary of the rectangle mark 202. In addition, the first boundary coordinate x_Left, the second boundary coordinate y_Top, the third boundary coordinate x_Right, and the fourth boundary coordinate y_Bottom may have units in pixels.

Referring to the above Table 1, a group of reference estimated parameters further includes a height parameter $H_{cub}$, a width parameter $W_{cub}$, a length parameter $L_{cub}$, a camera coordinate location parameter, and a rotation parameter Rot Y corresponding to a cuboid mark 204 in the reference image 210 and the reference image 220 shown in FIG. 2. The cuboid mark 204 defines a three-dimensional object range corresponding to the reference object images 201 in three-dimensional space, and the height parameter $H_{cub}$, the width parameter $W_{cub}$, the length parameter $L_{cub}$, the camera coordinate location parameter, and the rotation parameter Rot Y determine the three-dimensional center coordinates $(x_{C3D}, y_{C3D})$ for the projection of the center point 205 of the cuboid mark 204 in the image plane. The height parameter $H_{cub}$ may depict the height of the cuboid mark 204. The width parameter $W_{cub}$ may depict the width of the cuboid mark 204. The length parameter $L_{cub}$ may depict the length of the cuboid mark 204. The rotation parameter Rot Y may depict an angle by which the cuboid mark 204 rotate about the Y-axis of the camera coordinate system of the front (main) camera at the center point 205, namely an angle in the X-Z plane of the camera coordinate system between the direction of the long axis of the cuboid mark 204 and the X-axis of the camera coordinate system. In addition, the height parameter $H_{cub}$, the width parameter $W_{cub}$, and the length parameter $L_{cub}$ may have units in meters.

Referring to the above Table 1, the camera coordinate location parameter may include a parameter Loc_Z. The camera coordinate location parameter Loc_Z may depict the spatial distance on the camera coordinate Z-axis between a three-dimensional object corresponding to the reference object images 201 in three-dimensional space and the front (main) camera, namely a depth of the three-dimensional object corresponding to the reference object images 201 in three-dimensional space. In addition, the camera coordinate location parameter Loc_Z may have units in meters. In other embodiments, the camera coordinate location parameter may further include parameters Loc_X and Loc_Y to depict the spatial locations on the camera coordinate X-axis and Y-axis of the three-dimensional object corresponding to the reference object images 201 in three-dimensional space.

Referring to the above Table 1, the offset parameter may include a first offset parameter δx in the horizontal direction and a second offset parameter δy in the vertical direction in the image plane corresponding to the reference image 210. The first offset parameter δx and the second offset parameter δy of the offset parameter may be determined based on the three-dimensional center coordinates $(x_{C3D}, y_{C3D})$ and the two-dimensional image center coordinates $(x_{C2D}, y_{C2D})$ The first offset parameter δx and the second offset parameter δy of the offset parameter may depict coordinate distances between the two-dimensional image center coordinates $(x_{C2D}, y_{C2D})$ of the center point 203 of the rectangle mark 202 and the three-dimensional center coordinates $(x_{C3D}, y_{C3D})$ of the center point 205 of the cuboid mark 204 in the image plane of the reference image 210. In addition, the first offset parameter δx and the second offset parameter δy of the offset parameter may have units in pixels.

When the reference images and the reference estimated parameters (e.g., NuScenes dataset or KITTI dataset) for training the estimation module 121 are not annotated with the corresponding offset parameters, the offset parameters for each reference object may be calculated from the three-dimensional center coordinates $(x_{C3D}, y_{C3D})$ and the two-dimensional image center coordinates $(x_{C2D}, y_{C2D})$ thereof, and annotation may be made to each reference object. To be specific, the two-dimensional image center coordinates $(x_{C2D}, y_{C2D})$ may be calculated by Formula (1) below. Based on a camera calibration matrix P for the front (main) camera in Formula (2), the coordinates $(x_{cub}, y_{cub}, z_{cub})$ of the center point 205 of the cuboid mark 204 in the camera coordinates space may be calculated by Formula (3) to Formula (5) below. The length, width, and height dimensions C of the cuboid mark 204 after rotation by the parameter Rot Y may be described by Formula (6) below. The coordinates of eight vertices of the cuboid mark 204 in the three-dimensional camera coordinates space may be described by Formula (7) below. The projection coordinates for the eight vertices of the cuboid mark 204 in the two-dimensional image plane may be described by Formula (9) below, where Formula (9) may be derived from calculations on Formula (7) and Formula (8). The three-dimensional center coordinates $(x_{C3D}, y_{C3D})$ of the projection of the center point 205 of the cuboid mark 204 in the image plane may be calculated by Formula (10) below. Finally, the offset parameter (δx, δy) may be calculated by Formula (11) below.

$$(x_{C2D}, y_{C2D}) = \left(\frac{x\_Left + x\_Right}{2} + \frac{y\_Top + y\_Bottom}{2}\right) \quad (1)$$

$$P = \begin{bmatrix} P_{00} & P_{01} & P_{02} & P_{03} \\ P_{10} & P_{11} & P_{12} & P_{13} \\ P_{20} & P_{21} & P_{22} & P_{23} \end{bmatrix} \quad (2)$$

$$z_{cub} = Loc\_Z - P_{23} \quad (3)$$

$$y_{cub} = \frac{y_{C2D} x P_{13} - z_{cub} x P_{12}}{P_{11}} + \frac{H_{cub}}{2} \quad (4)$$

$$x_{cub} = \frac{x_{C2D} x P_{03} - z_{cub} x P_{02}}{P_{00}} \quad (5)$$

$$C = \begin{bmatrix} \cos(Rot\_Y) & 0 & \sin(Rot\_Y) \\ 0 & 1 & 0 \\ -\sin(Rot\_Y) & 0 & \cos(Rot\_Y) \end{bmatrix} \times \quad (6)$$

$$\begin{bmatrix} \frac{L_{cub}}{2} & \frac{L_{cub}}{2} & -\frac{L_{cub}}{2} & -\frac{L_{cub}}{2} & \frac{L_{cub}}{2} & \frac{L_{cub}}{2} & -\frac{L_{cub}}{2} & -\frac{L_{cub}}{2} \\ 0 & 0 & 0 & 0 & -H_{cub} & -H_{cub} & -H_{cub} & -H_{cub} \\ \frac{W_{cub}}{2} & -\frac{W_{cub}}{2} & -\frac{W_{cub}}{2} & \frac{W_{cub}}{2} & \frac{W_{cub}}{2} & -\frac{W_{cub}}{2} & -\frac{W_{cub}}{2} & \frac{W_{cub}}{2} \end{bmatrix}$$

$$V3D = \begin{bmatrix} x_{cub} + C_{00} & \ldots & x_{cub} + C_{07} \\ y_{cub} + C_{10} & \ldots & y_{cub} + C_{17} \\ z_{cub} + C_{20} & \ldots & z_{cub} + C_{27} \end{bmatrix} \quad (7)$$

$$V3D' = P \times \begin{bmatrix} V3D \\ 1\ldots 1 \end{bmatrix} \quad (8)$$

$$V2D = \begin{bmatrix} \frac{V3D'_{00}}{V3D'_{20}} & \frac{V3D'_{10}}{V3D'_{20}} \\ \frac{V3D'_{01}}{V3D'_{21}} & \frac{V3D'_{11}}{V3D'_{21}} \\ \vdots & \vdots \\ \frac{V3D'_{07}}{V3D'_{27}} & \frac{V3D'_{07}}{V3D'_{27}} \end{bmatrix} \quad (9)$$

-continued $$(x_{C3D}, y_{C3D}) = \left(\frac{V2D_{00} + V2D_{60}}{2} + \frac{V2D_{01} + V2D_{61}}{2}\right) \quad (10)$$

$$(\delta x, \delta y) = (x_{C3D} - x_{C2D}, y_{C3D} - y_{C2D}) \quad (11)$$

In addition, in an embodiment, the calculations of the above Formula (1) to Formula (11) may not be carried out when the first parameter δx and the second parameter δy of the offset parameter have been already annotated in the reference estimated parameters (e.g., acquired by other sensors in advance). In other embodiments, the estimated parameters may also include other parameters such as an object type, an object truncation state, and an object occlusion state.

In the present embodiment, the estimation module 121 is further trained by using L1 loss function. Herein, for example, the neutral network model may be trained with the L1 loss function of Formula (12) below to regress to obtain the offset parameter (δx, δy). In the Formula (12), N represents the number of keypoints in an image. $\widetilde{\delta_k}$ represents a predicted result of the offset parameter (δx, δy) of an object k. $\delta_k$ represents the real offset parameter of the object k. Therefore, after being subjected to a model training with the loss function of Formula (12), the estimation module 121 may realize a function of accurate regression estimation for the offset parameter. However, the estimation module 121 of the present disclosure is not limited to the aforementioned training mode with the L1 loss function. The estimation module 121 may also be trained by using other loss functions, e.g., a mean squared error (MSE) loss function or a mean squared logarithmic error (MSLE) loss function. Other estimated parameters in Table 1 (such as those related to the location or size of the object) may also be obtained by regression by training the estimation module 121 in a similar way, which will not be repeated here.

$$L_\delta = \frac{1}{N}\sum_{k=1}^{N}\left|\widetilde{\delta_k} - \delta_k\right| \quad (12)$$

The aforementioned training process of the estimation module 121 involves all objects present in the image captured by the front (main) camera and locations and sizes thereof in space, regardless of whether these objects has truncated images, and for an object that has a truncated image part in the image captured by the front (main) camera, other truncated image parts of the object can be obtained from the image captured by the side (auxiliary) camera to train the estimation module 121 on truncated image identification. Therefore, the estimation module 121 trained as above is capable of identifying and locating an object truncated in an image more accurately, so that the range of the truncated object in three-dimensional space can be accurately determined afterwards based on only an image by a single monocular camera (rather than images captured by a plurality of cameras), without the aforementioned error as shown in FIG. 5. Thus, after the training of the estimation module 121 is completed, the estimation module 121 is capable of outputting a plurality of detected estimated parameters as shown in the above Table 1 when, for example, an image sensed by a single monocular camera is input to the estimation module 121. The processor 110 may calculate two-dimensional image center coordinates ($x_{C2D}$, $y_{C2D}$) based on the plurality of detected estimated parameters output by the estimation module 121, and may further calculate the three-dimensional center coordinates ($x_{C3D}$, $y_{C3D}$) based on the two-dimensional image center coordinates ($x_{C2D}$, $y_{C2D}$) and the offset parameter (δx, δy) output by the estimation module 121.

Figure 3:
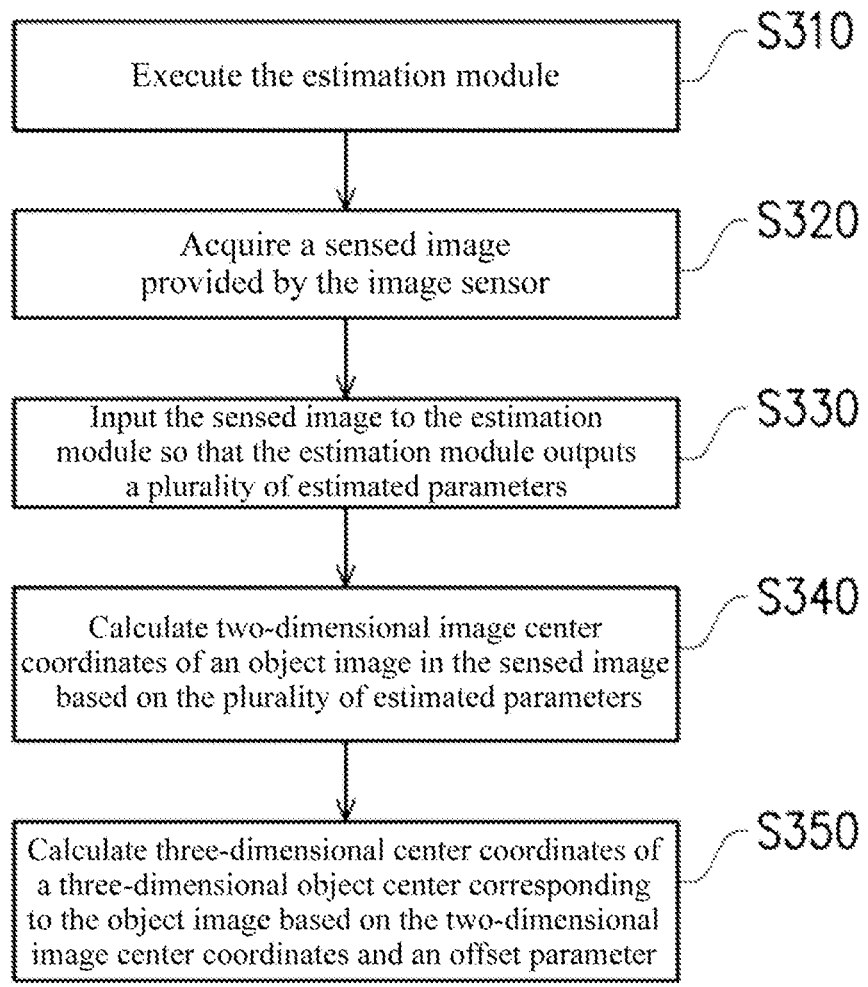
FIG. 3 is a flowchart illustrating an object detection method according to an embodiment of the present disclosure.
Figure 4:
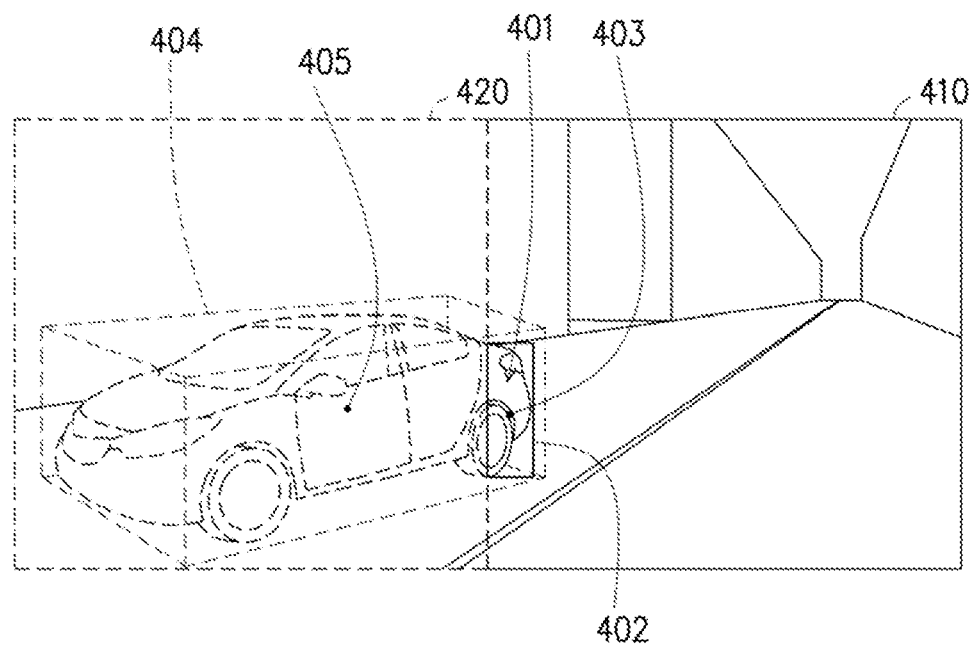
FIG. 4 is a diagram illustrating a sensed image according to an embodiment of the present disclosure.

FIG. 3 is a flowchart illustrating an object detection method according to an embodiment of the present disclosure. FIG. 4 is a diagram illustrating a sensed image according to an embodiment of the present disclosure. Referring to FIG. 1, FIG. 3, and FIG. 4, the electronic apparatus 100 may perform steps S310 to S350 below to implement the object detection function, and FIG. 4 illustrates a sensed image 410 provided by the image sensor 200 (e.g., a monocular camera) and a diagram 420 illustrating the real world outside the range of the sensed image 410 (i.e., not captured by the image sensor 200) to assist in description. The sensed image 410 may include an object image 401, and the object image 401 is an image of a vehicle. It needs to be noted that the object image 401 is a truncated image in the sensed image 410. In step S310, the processor 110 may execute the estimation module 121. In step S320, the processor 110 may acquire the sensed image 410 provided by the image sensor 200. In the present embodiment, the electronic apparatus 100 can detect an object with only a single image sensor 200 in actual object detection applications. In step S330, the processor 110 may input the sensed image 410 to the estimation module 121 so that the estimation module 121 outputs a plurality of keypoints and a plurality of groups of corresponding detected estimated parameters, with each keypoint corresponding to a respective object detected from the sensed image 410. FIG. 4 illustrates only one object image 401 for description purposes. However, one skilled in the art will understand that object images of a plurality of objects (e.g., a plurality of vehicles) may be detected from the sensed image 410.

In the present embodiment, corresponding detected estimated parameters may include a plurality of estimated parameters as shown in the above Table 1. In particular, the processor 110 may subsequently define a rectangle mark 402 for the object image 401, and the plurality of estimated parameters include a first boundary coordinate, a second boundary coordinate, a third boundary coordinate, and a fourth boundary coordinate corresponding to the rectangle mark 402. The first boundary coordinate may depict the location of the left boundary of the rectangle mark 402. The second boundary coordinate may depict the location of the top boundary of the rectangle mark 402. The third boundary coordinate may depict the location of the right boundary of the rectangle mark 402. The fourth boundary coordinate may depict the location of the bottom boundary of the rectangle mark 402. In the present embodiment, the processor 110 may subsequently define a cuboid mark 404 for the object image 401, and the plurality of estimated parameters further include a height parameter, a width parameter, a length parameter, a camera coordinate location parameter, and a rotation parameter corresponding to the cuboid mark 404. As shown in FIG. 4, the rectangle mark 402 is the image range of the object image 401 in the sensed image 410, and the cuboid mark 404 is the range of the object in the object image 401 in three-dimensional space, which has a part outside the range of the sensed image 410.

In step S340, the processor 110 may calculate the two-dimensional image center coordinates ($x_{C2D}$, $y_{C2D}$) of the object image 401 in the sensed image 410 based on the plurality of estimated parameters. In the present embodiment, the processor 110 may calculate the two-dimensional image center coordinates ($x_{C2D}$, $y_{C2D}$) of the center point 403 of the rectangle mark 402 based on the first boundary coordinate, second boundary coordinate, the third boundary coordinate, and fourth boundary coordinate.

In step S350, the processor 110 may calculate the three-dimensional center coordinates ($x_{C3D}$, $y_{C3D}$) of the three-dimensional object center corresponding to the object image 401 (i.e., the projection of the center point 405 of the cuboid mark 404 in the image plane) based on the two-dimensional image center coordinates ($x_{C2D}$, $y_{C2D}$) and the offset parameter ($\delta x$, $\delta y$). In the present embodiment, the processor 110 may add the two-dimensional image center coordinates ($x_{C2D}$, $y_{C2D}$) and the offset parameter ($\delta x$, $\delta y$) together to obtain the three-dimensional center coordinates ($x_{C3D}$, $y_{C3D}$). In an embodiment, the processor 110 may also calculate the coordinates of each vertex of the cuboid mark 404 corresponding to the object image 401 based on the three-dimensional center coordinates ($x_{C3D}$, $y_{C3D}$) of the center point 405 of the cuboid mark 404 and the corresponding height parameter, width parameter, length parameter, camera coordinate location parameter, and rotation parameter output by the estimation module 121, where the calculation may be derived by reversing the calculation processes of the above Formulas (1) to (11), which will not be repeated here.

It needs to be noted that at least one of the first parameter and second parameter of the offset parameter is nonzero because the object image 401 is a truncated image in the sensed image 410. In other words, because the rectangle mark 402 only indicates the image range of the object image 401 in the sensed image 410 and the cuboid mark 404 indicates the complete range of the object of the object image 401 in three-dimensional space which may have a part outside the sensed image 410, the center point 403 of the rectangle mark 402 does not coincide with the center point 405 of the cuboid mark 404. As shown in FIG. 4, the center point 405 of the cuboid mark 404 may even be outside the image range of the sensed image 410. On the contrary, when the object image is a complete image, the first parameter and the second parameter of the offset parameter are generally both zero. In addition, in other embodiments, the center point 405 of the cuboid mark 404 may also be within or outside the image range of the sensed image 410, and not limited to what is shown in FIG. 4. The distance between the center point 403 of the rectangle mark 402 and the center point 405 of the cuboid mark 404 (i.e., the value of the offset parameter ($\delta x$, $\delta y$)) is affected by the degree of truncation of the object image 401. The distance between the center point 403 of the rectangle mark 402 and the center point 405 of the cuboid mark 404 may be positively correlated with the degree of truncation of the object image 401. Thus, the electronic apparatus 100 may acquire the accurate location of an actual object in the image plane of the sensed image 410, so that a subsequent function such as automatic vehicle warning, distance detection between vehicles, or automatic vehicle driving can be effectively implemented with the accurate object distance detection result.

On the other hand, when a vehicle implements a function such as automatic vehicle warning, distance detection between vehicles, or automatic vehicle driving, the processor 110 does not have to wait for the image sensor 200 to acquire a sensed image including a complete vehicle image and can perform accurate distance and/or location determinations immediately with respect to a truncated vehicle image for accurate distance and/or location determinations. Therefore, the electronic apparatus and the object detection method of the present disclosure may further have the effects of improving the object detection efficiency and shortening the response time.

In addition, the plurality of estimated parameters and the related parameters in this embodiment may be calculated and applied accordingly with reference to the calculations of the plurality of estimated parameters and the related parameters described in the embodiment shown in FIG. 2, so that sufficient teachings, suggestions and embodiments can be obtained, which therefore will not be repeated here.

In summary, the electronic apparatus and the object detection method of the present disclosure may provide, for a truncated object image in the sensed image, a highly reliable estimation result of the accurate location information of an actual object in the image plane of a sensed image. According to the present disclosure, the training process of the estimation module involves all objects present in the images captured by a plurality of cameras and locations and sizes thereof in space, and for an object which has a truncated image part in the image captured by one camera, other truncated image parts thereof can be obtained from the image captured by another camera to train the estimation module to identify truncated images. Therefore, a truncated object in an image can be identified and located more accurately, so that the range of the truncated object in three-dimensional space can be accurately determined just basing on an image captured by a single monocular camera.

Described above are merely descriptions of preferred embodiments of the present disclosure, and are not intended to limit the present disclosure. Further modifications and variations can be made by those skilled in the art without departing from the spirit and scope of the present disclosure. Accordingly, the protection scope of the present disclosure shall be defined by the appended claims.

What is claimed is:

1. An electronic apparatus, comprising:
a storage device, configured to store an estimation module; and
a processor, coupled to the storage device and configured to execute the estimation module,
wherein the processor is further configured to acquire a sensed image provided by an image sensor, and input the sensed image to the estimation module so that the estimation module outputs a plurality of estimated parameters, and
the processor is further configured to calculate two-dimensional image center coordinates of an object image in the sensed image based on the plurality of estimated parameters, and calculate three-dimensional center coordinates corresponding to the object image based on the two-dimensional image center coordinates and an offset parameter in the plurality of estimated parameters,
wherein the offset parameter includes a first parameter and a second parameter, and
wherein when the object image is a truncated image, at least one of the first parameter or the second parameter is nonzero.

2. The electronic apparatus according to claim 1, wherein the first parameter corresponds to a horizontal direction in an image plane of the sensed image and the second parameter corresponds to a vertical direction in the image plane of the sensed image.

3. The electronic apparatus according to claim 1, wherein when the object image is a complete image, the first parameter and the second parameter are both zero.

4. The electronic apparatus according to claim 1, wherein the processor is further configured to define a rectangle mark for the object image, and the plurality of estimated parameters comprise a first boundary coordinate, a second boundary coordinate, a third boundary coordinate, and a fourth boundary coordinate corresponding to the rectangle mark, and the processor is further configured to calculate the two-dimensional image center coordinates based on the first boundary coordinate, the second boundary coordinate, the third boundary coordinate, and the fourth boundary coordinate.

5. The electronic apparatus according to claim 1, wherein the processor is further configured to define a cuboid mark for the object image, and the plurality of estimated parameters include a height parameter, a width parameter, a length parameter, a camera coordinate location parameter, and a rotation parameter corresponding to the cuboid mark, and the processor is further configured to calculate coordinates of vertices of the cuboid mark based on the height parameter, the width parameter, the length parameter, the camera coordinate location parameter, the rotation parameter, and the three-dimensional center coordinates.

6. The electronic apparatus according to claim 1, wherein the three-dimensional center coordinates corresponding to the object image are outside the object image.

7. The electronic apparatus according to claim 1, wherein the processor is further configured to add the two-dimensional image center coordinates and the offset parameter together to obtain the three-dimensional center coordinates.

8. The electronic apparatus according to claim 1, wherein the image sensor is a single monocular camera.

9. The electronic apparatus according to claim 8, wherein the estimation module is trained with a plurality of groups of reference images acquired by a plurality of cameras and a plurality of groups of reference estimated parameters corresponding to the plurality of groups of reference images, and each of the plurality of groups of reference images includes at least an image of a reference object, wherein each reference object corresponds to a group of reference estimated parameters.

10. The electronic apparatus according to claim 9, wherein the offset parameter in the reference estimated parameters for training the estimation module is calculated from other estimated parameters in the reference estimated parameters.

11. An object detection method, comprising:
executing an estimation module;
acquiring a sensed image provided by an image sensor;
inputting the sensed image to the estimation module so that the estimation module outputs a plurality of estimated parameters;
calculating two-dimensional image center coordinates of an object image in the sensed image based on the plurality of estimated parameters; and
calculating three-dimensional center coordinates corresponding to the object image based on the two-dimensional image center coordinates and an offset parameter in the plurality of estimated parameters,
wherein the offset parameter includes a first parameter and a second parameter, and
wherein when the object image is a truncated image, at least one of the first parameter or the second parameter is nonzero.

12. The object detection method according to claim 11, wherein the first parameter corresponds to a horizontal direction in an image plane of the sensed image and the second parameter corresponds to a vertical direction in the image plane of the sensed image.

13. The object detection method according to claim 12, wherein when the object image is a complete image, the first parameter and the second parameter are both zero.

14. The object detection method according to claim 11, wherein the calculating the two-dimensional image center coordinates comprises:
defining a rectangle mark for the object image, wherein the plurality of estimated parameters include a first boundary coordinate, a second boundary coordinate, a third boundary coordinate, and a fourth boundary coordinate corresponding to the rectangle mark; and
calculating the two-dimensional image center coordinates based on the first boundary coordinate, the second boundary coordinate, the third boundary coordinate, and the fourth boundary coordinate.

15. The object detection method according to claim 11, further comprising:
defining a cuboid mark for the object image, wherein the plurality of estimated parameters include a height parameter, a width parameter, a length parameter, a camera coordinate location parameter, and a rotation parameter corresponding to the cuboid mark; and
calculating coordinates of vertices of the cuboid mark based on the height parameter, the width parameter, the length parameter, the camera coordinate location parameter, the rotation parameter, and the three-dimensional center coordinates.

16. The object detection method according to claim 11, wherein the three-dimensional center coordinates corresponding to the object image are outside the object image.

17. The object detection method according to claim 11, wherein the calculating the three-dimensional center coordinates of the object image comprises:
adding the two-dimensional image center coordinates and the offset parameter together to obtain the three-dimensional center coordinates.

18. The object detection method according to claim 11, wherein the image sensor is a single monocular camera.

19. The object detection method according to claim 18, further comprising:
training the estimation module with a plurality of groups of reference images acquired by a plurality of cameras and a plurality of groups of reference estimated parameters corresponding to the plurality of groups of reference images, wherein each of the plurality of groups of reference images includes at least an image of a reference object, and each reference object corresponds to a group of reference estimated parameters.

20. The object detection method according to claim 19, wherein training the estimation module comprises:
calculating the offset parameter in the reference estimated parameters from other estimated parameters in the reference estimated parameters.

* * * * *